(12) United States Patent
Vaughan

(10) Patent No.: US 8,588,776 B1
(45) Date of Patent: Nov. 19, 2013

(54) USER CONTROLLED BASE STATION SELECTION

(75) Inventor: Gary Francis Vaughan, Centennial, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 1344 days.

(21) Appl. No.: 12/354,093

(22) Filed: Jan. 15, 2009

(51) Int. Cl.
*H04W 4/00* (2009.01)

(52) U.S. Cl.
USPC ............... 455/435.2; 455/445; 455/456.5; 455/421; 370/395.21; 370/395.2

(58) Field of Classification Search
USPC .............................. 455/435.1–444
See application file for complete search history.

(56) References Cited

U.S. PATENT DOCUMENTS

| | | | |
|---|---|---|---|
| 2004/0202132 A1* | 10/2004 | Heinonen et al. | 370/331 |
| 2005/0101329 A1 | 5/2005 | Gallagher | |
| 2007/0054668 A1* | 3/2007 | Scheinert et al. | 455/435.1 |
| 2007/0105527 A1 | 5/2007 | Nylander et al. | |
| 2007/0183427 A1 | 8/2007 | Nylander et al. | |
| 2007/0270152 A1 | 11/2007 | Nylander et al. | |
| 2008/0076386 A1 | 3/2008 | Khetawat et al. | |
| 2008/0076411 A1 | 3/2008 | Khetawat et al. | |
| 2008/0076419 A1 | 3/2008 | Khetawat et al. | |
| 2008/0076420 A1 | 3/2008 | Khetawat et al. | |
| 2008/0076425 A1 | 3/2008 | Khetawat et al. | |
| 2008/0130555 A1* | 6/2008 | Kalhan | 370/329 |
| 2008/0254792 A1* | 10/2008 | Ch'ng | 455/435.1 |
| 2009/0092111 A1* | 4/2009 | Horn et al. | 370/338 |
| 2009/0094351 A1* | 4/2009 | Gupta et al. | 709/220 |

* cited by examiner

*Primary Examiner* — Rafael Pérez-Gutiérrez
*Assistant Examiner* — Keith Fang

(57) ABSTRACT

A communication system for controlling with which base station a mobile station exchanges user communications. A first base station of a plurality of base stations with which the mobile station communicates is configured to receive a user selection from a user. The user selection indicates that the mobile station is near the first base station. In response to the user selection, the first base station transfers a notification message indicating that the mobile station is nearby the first base station. A communication control system receives the notification message from the first base station. In response to receiving the notification message, the communication control system transfers a control message for delivery to the mobile station to limit the mobile station to exchanging user communications only with the first base station. The first base station exchanges user communications with the mobile station.

19 Claims, 7 Drawing Sheets

FIGURE 4

USER CONTROLLED BASE STATION SELECTION

TECHNICAL BACKGROUND

When a mobile device stays in a location serviced by multiple access points, the mobile device may continually handoff between different access points. Frequent handoffs are caused when the signal strengths from multiple access points vary above and below a handoff signal strength threshold even when a mobile device is stationary within a location. Handoffs are designed to seamlessly switch communications from one access point to another. However, when a mobile device hands off too frequently between multiple access points, undesirable behavior may arise. Some examples of undesirable behavior are missed calls, dropped calls, and slower data rates. Additionally, some access points may not be capable of accepting incoming handoffs.

OVERVIEW

A communication system for controlling with which base station a mobile station exchanges user communications is disclosed. A first base station of a plurality of base stations with which the mobile station communicates is configured to receive a user selection from a user. The user selection indicates that the mobile station is near the first base station. In response to the user selection, the first base station transfers a notification message indicating that the mobile station is nearby the first base station.

A communication control system receives the notification message from the first base station. In response to receiving the notification message, the communication control system transfers a control message for delivery to the mobile station to limit the mobile station to exchanging user communications only with the first base station.

The first base station exchanges user communications with the mobile station.

DETAILED DESCRIPTION

Figure 1:
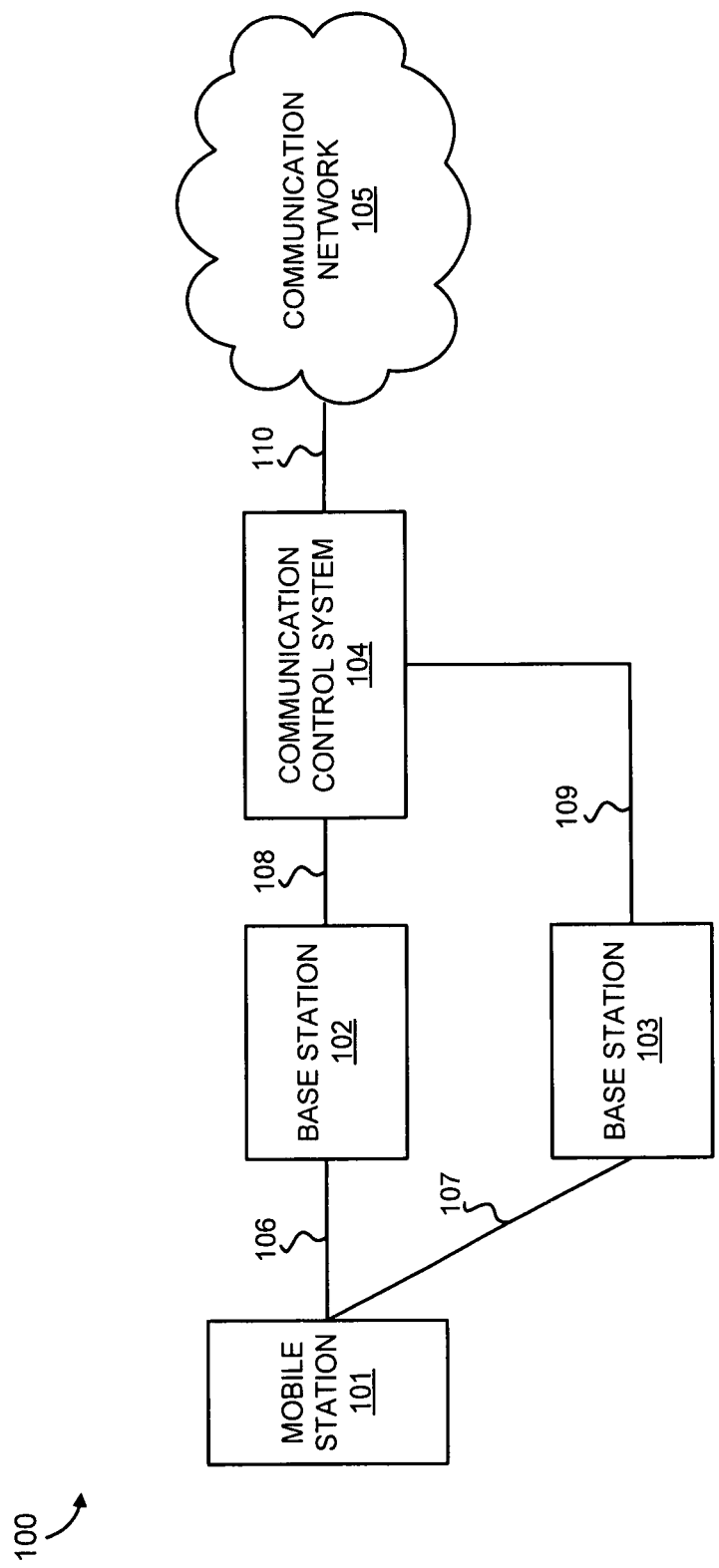
FIG. 1 is a block diagram illustrating a communication system.

FIG. 1 is a block diagram illustrating communication system 100. Communication system 100 comprises mobile station 101, base stations 102-103, communication control system 104, and communication network 105. Mobile station 101 communicates with base station 102 over link 106. Mobile station 101 and base station 103 communicate over link 107. Base station 102 and communication control system 104 communicate over link 108. Base station 103 and communication control system 104 communicate over link 109. Communication control system 104 and communication network 105 communicate over link 110.

Mobile station 101 comprises a mobile communication device capable of communicating with communication control system 104 or communication network 106 via base stations 102 and 103. Examples of mobile stations include mobile phones, computers, personal digital assistants, music players, video players, network interface cards, or some other wireless communication apparatus—including combinations thereof. Mobile station 101 transmits and receives user communications and status communications. User communications may include control messages voice communications, data communications, and incoming call notifications. Status communications may consist of quality of service information, base station information, or other mobile station and network information.

Base station 102 comprises a communication system capable of communicating with mobile station 101 over link 106 and communication control system 104 over link 108. Link 108 may be a backhaul link such as a T-1 link, an Ethernet link, a microwave link, cable Internet, DSL, or some other link for backhaul communications. Base station 102 can also be referred to as a radio base station or a base transceiver station.

Base station 103 comprises a communication system capable of communicating with mobile station 101 over link 107 and communication control system 104 over link 109. Link 109 may be a backhaul link such as a T-1 link, an Ethernet link, a microwave link, cable Internet, DSL, or some other link for backhaul communications. Base station 103 can also be referred to as a radio base station or a base transceiver station.

Communication control system 104 comprises a communication interface, a user interface, and a processing system. The communications interface comprises components that allow communication control system 104 to communicate with base stations 102-103 and communication network 105. The processing system includes a storage device that stores operating software. The processing system also includes circuitry configured to execute the instructions of the operating software. The circuitry comprises a microprocessor, memory, and other circuitry that retrieves and executes the operating software from the storage device. The operating software directs the processing system to operate communication control system 104 as described herein.

Communication network 105 comprises any network or collection of networks, such as a wireless communication network, a public switched telephone network, an intranet, or an Internet. Links 106 and 107 are wireless communication links. Links 106 and 107 may use various protocols, such as wireless fidelity, code division multiple access, time division multiple access, GSM, LTE, or some other wireless communication format—including combinations or variations thereof. Links 108-110 use various communication media, such as air, metal, optical fiber, or some other signal propagation path—including combinations or variations thereof. Links 108-110 use various protocols, such as Internet, telephony, optical networking, wireless communication, wireless fidelity, world wide interoperability for microwave access, or some other communication format—including combinations or variations thereof. Links 108-110 may be direct links or they may include various intermediate components, systems, and networks.

In operation mobile station 101 can communicate with base station 102, base station 103, or both base station 102 and 103 concurrently. Communication control system 104 may determine with which of base stations 102 and 103 mobile station 101 should communicate.

Figure 2:
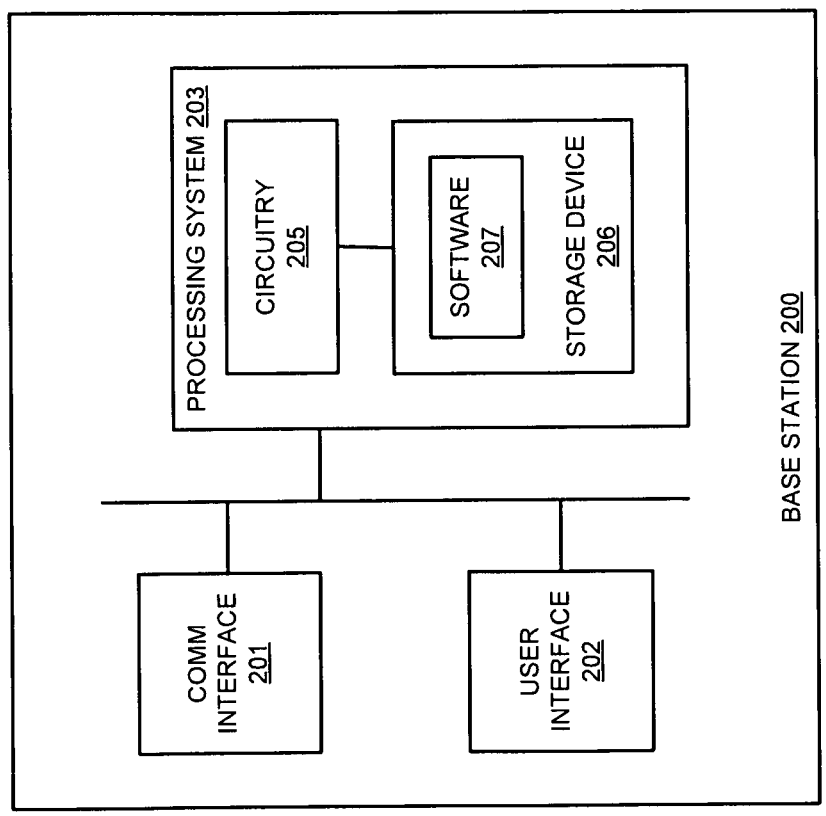
FIG. 2 is a block diagram illustrating a base station.

FIG. 2 is a block diagram illustrating a base station 200. Base station 200 is an example of base stations 102 and 103, although base stations 102 and 103 may use alternative configurations. Base station 200 comprises communication interface 201, user interface 202, and processing system 203. Processing system 203 is linked to communication interface 201 and user interface 202. Processing system 203 includes circuitry 205 and storage device 206 that stores operating software 207. Base station 200 may be an example of base stations 102 and 103.

Communication interface 201 comprises components that communicate over links 106-109 under the control of processing system 203. Communication interface 201 may include a port, modem, network interface, wireless transceiver, antenna, or some other communication device. Thus, communication interface 201 would transfer and receive user communications from mobile station 101 and communication control system 104.

User interface 202 comprises components that interact with the user under the control of processing system 203. User interface 202 may include a speaker, microphone, buttons, lights, display screen, touch screen, touchpad, scroll wheel, remote control or some other user input/output apparatus. User interface 202 may receive a selection from the user indicating that mobile station is near base station 200.

Circuitry 205 comprises microprocessor and other circuitry that retrieves and executes operating software 207 from storage device 206 to control communication interface 201 and user interface 202. Storage device 206 comprises a disk drive, flash drive, memory circuitry, or some other memory device. Operating software 207 comprises computer programs, firmware, or some other form of machine-readable processing instructions. Operating software 207 may include an operating system, utilities, drivers, network interfaces, applications, or some other type of software. When executed by circuitry 205, operating software 207 directs processing system 203 to operate base station 200 as described herein.

Figure 3:
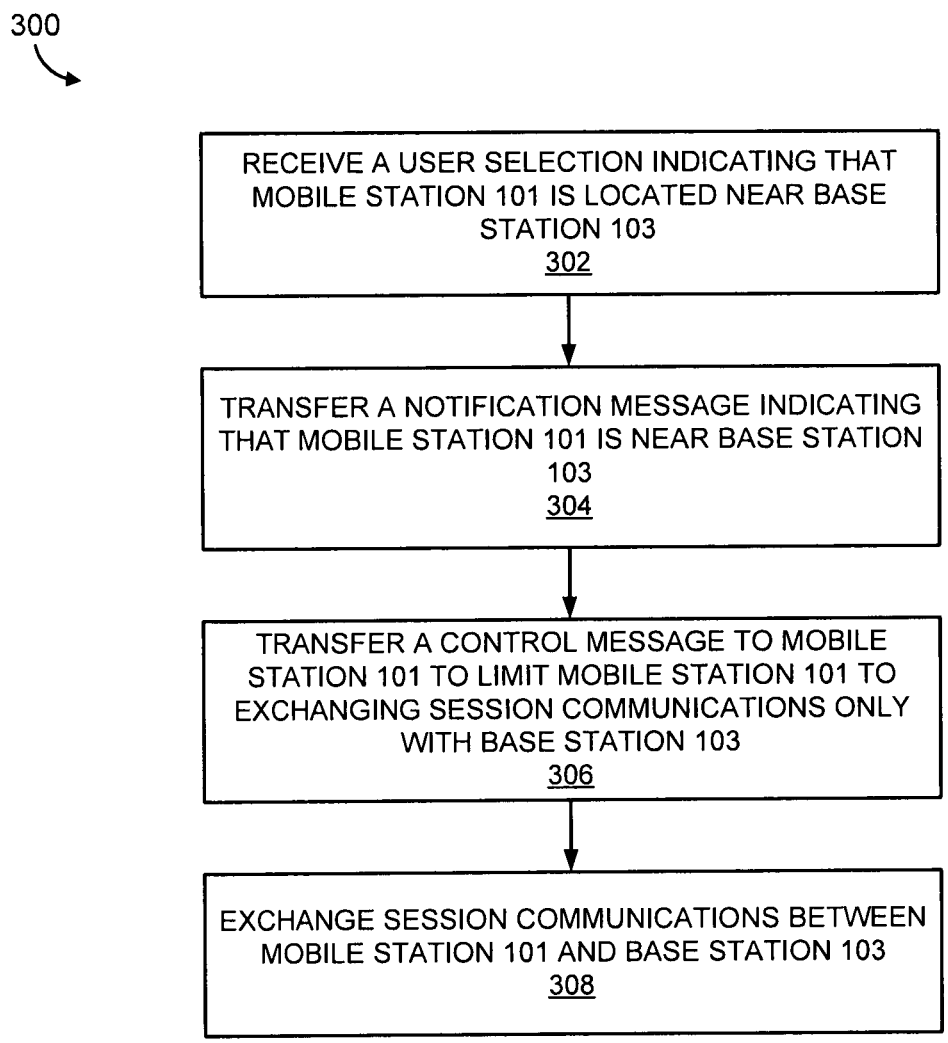
FIG. 3 is a flow diagram illustrating a process for preventing handoffs in a communication system.

FIG. 3 is a flow diagram illustrating the operation of communication system 100. First, in step 302, a user selection is received indicating that mobile station 101 is located near base station 103. The user selection may be made using a user interface included in mobile station 101, base stations 102-103, or any other user accessible interface to communication system 100.

In step 304, a notification message is transferred in response to the user selection of step 302. The notification message indicates that mobile station 101 is located near base station 103. The notification message may be transmitted to communication control system 104, base station 103, base station 102, mobile station 101, or combinations thereof. The elements of communication network that need to receive the notification message vary depending on the wireless protocol used by links 106 and 107 in communication network 100.

In step 306, a control message is transferred to mobile station 101 limiting mobile station 101 to exchanging user communications solely with base station 103. Mobile station then exchanges user communications only with base station 103 (308). User communications may be exchanged solely with base station 103 for a period of time. The period of time may terminate upon another user selection, expiration of a time limit, exiting a specified area, or some other indication that mobile station 101 should no longer communicate solely with base station 103.

Figure 4:
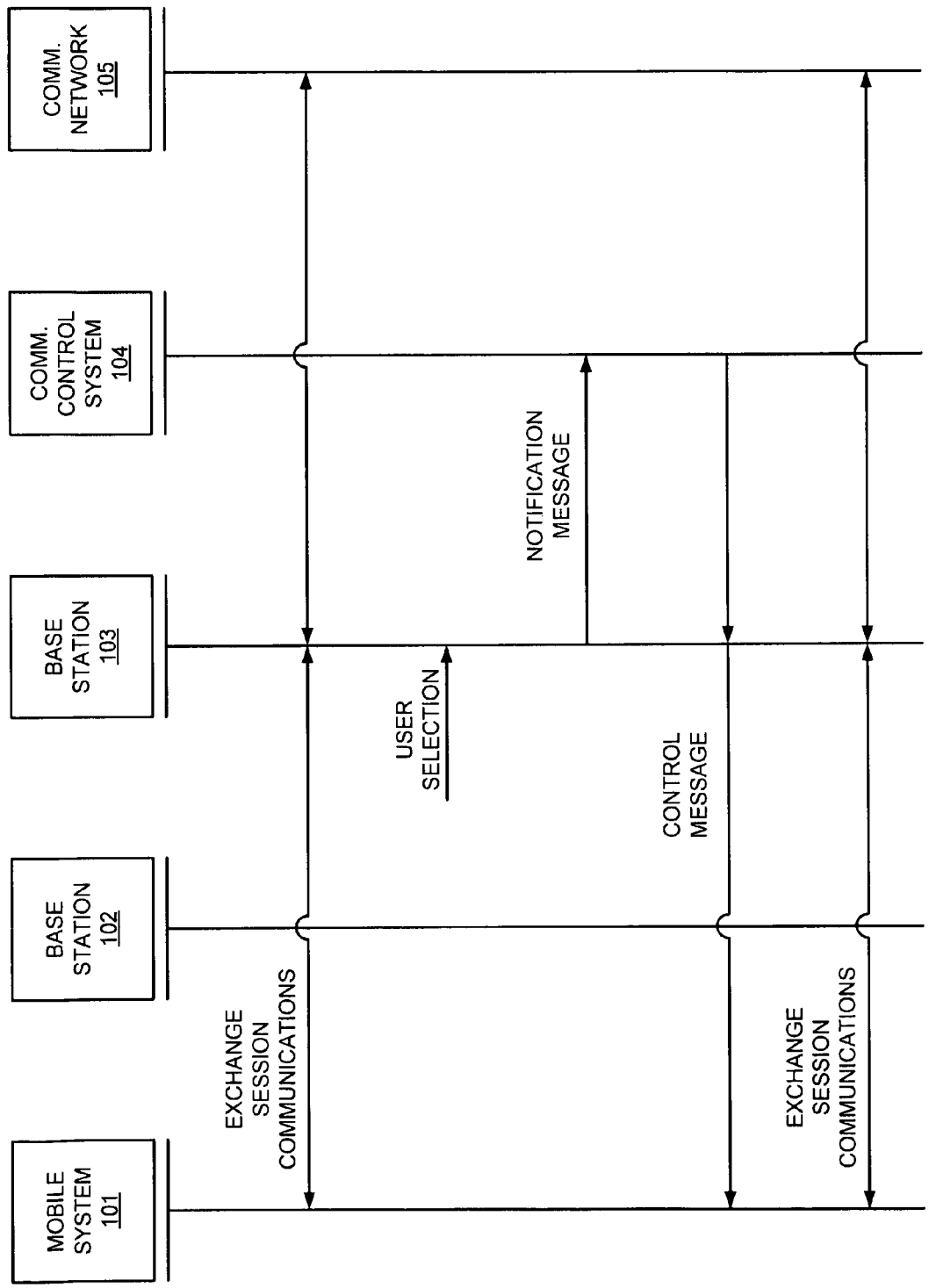
FIG. 4 is a sequence diagram illustrating an exemplary embodiment.

FIG. 4 illustrates a sequence diagram that describes an embodiment whereby base station 103 receives the user selection of step 302, as shown in FIG. 3. In this embodiment, mobile station 101 is already communicating with base station 103. Base station 103 receives the user selection indicating that mobile station 101 is located near base station 103. Base station 103 receives the user selection via a user interface. The user interface may include a button, switch, touchpad, touch screen, scroll wheel, remote control, or some other type of user input apparatus.

In response to the user selection, base station 103 transfers a notification message to communication control system 102. The notification message informs communication control system 104 that mobile station 101 is located near base station 103. The notification message may contain location and identification information about mobile device 101, base stations 102-103, or any other information needed by communication control system 102.

Communication control system 104 then transfers a control message to mobile station 101 through base station 103. The control message limits mobile station 101 to exchanging user communications only with base station 103.

Mobile station 101 receives the control signal. Mobile station 101 exchanges user communications only with base station 103. Base station 103 can either forward user communications directly to communications network 105 or the user communications can be directed through communications control system 104.

Figure 5:
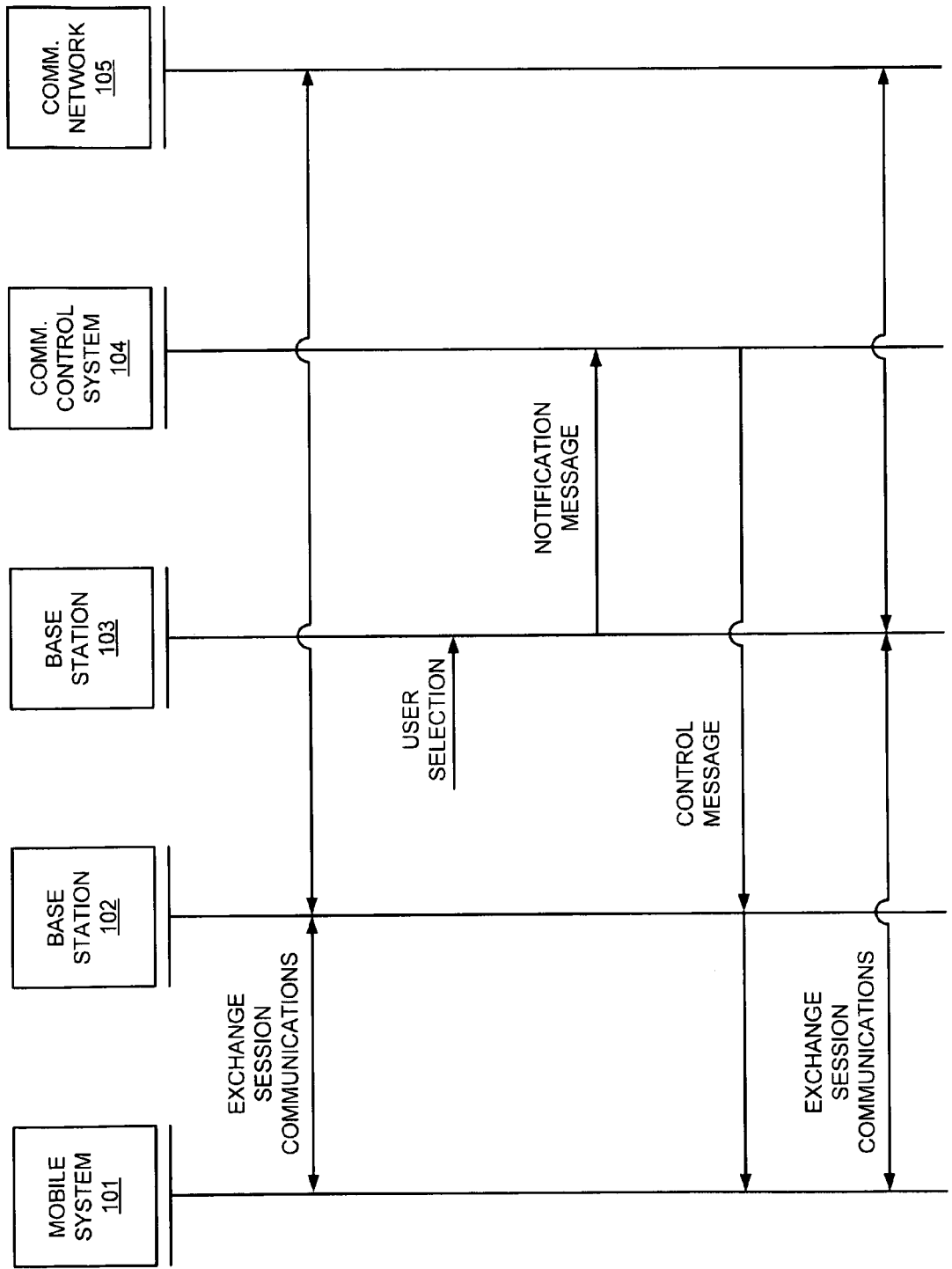
FIG. 5 is a sequence diagram illustrating an exemplary embodiment.

FIG. 5 illustrates a sequence diagram that describes an embodiment whereby base station 103 receives the user selection of step 302, as shown in FIG. 3. In this embodiment, mobile station 101 is communicating with base station 102. Base station 103 receives the user selection indicating that mobile station 101 is located near base station 103. The user selection also indicates that mobile station 101 needs to stop exchanging user communications with base station 102 and exchange user communications with base station 103. Base station 103 receives the user selection via a user interface. The user interface may include a button, switch, touchpad, touch screen, scroll wheel, remote control, or some other type of user input apparatus.

In response to the user selection, base station 103 transfers a notification message to communication control system 102. The notification message informs communication control system 104 that mobile station 101 is located near base station 103. The notification message may contain location and identification information about mobile device 101, base stations 102-103, or any other information needed by communication control system 102.

Communication control system 104 then transfers a control message to mobile station 101 through base station 102. The control message instructs mobile station 101 to begin exchanging user communications with base station 103. The control message further instructs mobile station 101 to stop exchanging user communications with base station 102. The control message further limits mobile station 101 to exchanging user communications only with base station 103.

Mobile station 101 receives the control signal. Mobile station 101 begins exchanging user communications with base station 103 and stops exchanging user communications with base station 102. Mobile station 101 then exchanges user communications only with base station 103. Base station 103 can either forward user communications directly to communications network 105 or the user communications can be directed through communications control system 104.

Figure 6:
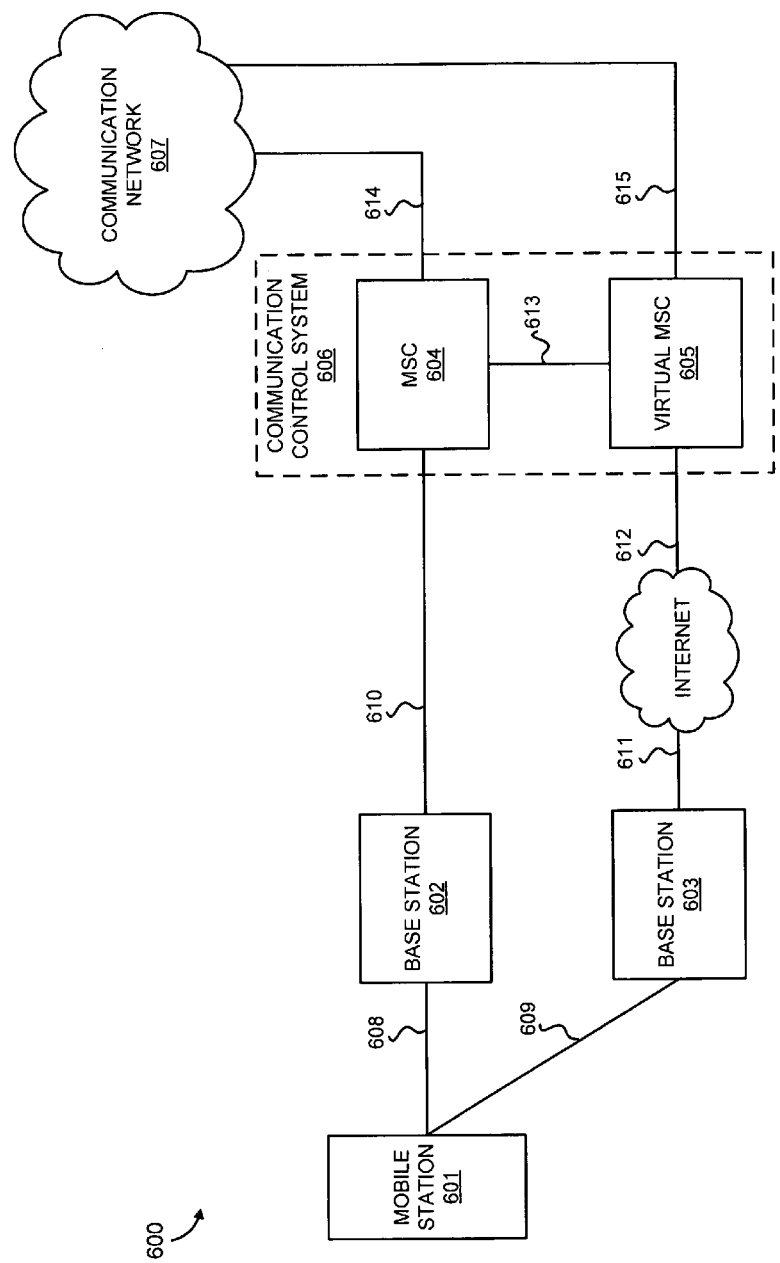
FIG. 6 is a block diagram illustrating the communication system.

FIG. 6 is a block diagram illustrating communication system 600. Communication system 600 comprises mobile station 601, base stations 602-603, mobile switching center (MSC) 604, virtual MSC 605, and communication network 606. Mobile station 601 communicates with base station 602 over link 608. Mobile station 601 communicates with base station 603 over link 609. Base station 602 communicates with MSC 604 over link 610. MSC 604 communicates with communication network 607 over link 614. Base station 603 communicates with the Internet over link 611. Virtual MSC 605 communicates with the Internet over link 612. Virtual MSC 605 communicates with MSC 604 over link 613. Virtual MSC 605 communicates with communication network 607 over link 615.

Mobile station 601 comprises a mobile communication device capable of communicating with communication control system 606 or communication network 607 via base stations 602 and 603. Examples of mobile stations include mobile phones, computers, personal digital assistants, music players, video players, network interface cards, or some other wireless communication apparatus—including combinations thereof. Mobile station 601 transmits and receives user communications and status communications. User communications may include control messages voice communications, data communications, and incoming call notifications. Status communications may consist of quality of service information, base station information, or other mobile station and network information.

Base station 602 comprises a communication system capable of communicating with mobile station 601 over link 608 and MSC 604 within communication control system 606 over link 610. Link 610 may be a backhaul link such as a T-1 link, an Ethernet link, a microwave link, or some other link for backhaul communications. Base station 602 can also be referred to as a radio base station or a base transceiver station.

Base station 603 comprises a communication system capable of communicating with mobile station 601 over link 609 and virtual MSC 605 within communication control system 606 over links 611 and 612 through the Internet. Base station 103 can also be referred to as a radio base station or a base transceiver station. Base station 603 may be a low power base station such as a femtocell.

Communications control system 606 includes elements that allow mobile station 601 to communicate with communication network 607 through base stations 602 and 603. MSC 604 and virtual MSC 605 are included in communication control system 606. MSC 604 includes elements capable of providing communication between base station 602 and communication network 607. Virtual MSC 605 may include communication equipment such as a wireless soft switch, a media gateway, or other elements necessary for mobile station 601 to communicate with communications network 607 or MSC 604.

In operation, mobile station 601 communicates with base stations 602 or 603 either separately or concurrently. Base station 603 receives a user selection. Base station 603 receives the user selection via a user interface. The user interface may include a button, switch, touchpad, touch screen, scroll wheel, remote control, or some other type of user input apparatus.

In one example of this embodiment, mobile station 601 is exchanging user communications with base station 603. In response to the user selection, base station 603 transfers a notification message to virtual MSC 605 over the Internet. Virtual MSC 605 receives the notification message via the Internet from base station 603. Virtual MSC 605 may then forward the notification message on to MSC 604 over link 613. Link 613 may also be a link over the Internet. Link 613 may also be an internal wired link if virtual MSC 605 is collocated with MSC 604. The notification message informs virtual MSC 605 that mobile station 601 is located near base station 603. The notification message may contain information about mobile device 601, base stations 102-103, or any other information needed by either virtual MSC 605 or MSC 604.

Upon receipt of the notification message, virtual MSC 605 transfers a control message to mobile station 601 through base station 603. The control message limits mobile station 601 to exchanging user communications only with base station 603. Mobile station 601 receives the control signal. Mobile station 601 exchanges user communications only with base station 603. Mobile station 601 may continue to exchange status communications with base station 602.

In another example mobile station 601 is exchanging user communications with base station 602. In response to the user selection, base station 603 transfers a notification message to virtual MSC 605 over the Internet. Virtual MSC 605 receives the notification message via the Internet from base station 603. Virtual MSC 605 then forwards the notification message on to MSC 604 over link 613. Link 613 may also be a link over the Internet. Link 613 may also be an internal wired link if virtual MSC 605 is collocated with MSC 604. The notification message informs MSC 604 and virtual MSC 605 that mobile station 601 is located near base station 603. The notification message may contain information about mobile device 601, base stations 102-103, or any other information needed by either virtual MSC 605 or MSC 604.

Upon receipt of the control message, MSC 604 transfers a control message to mobile station 601 through base station 602. Alternatively, virtual MSC 605 may send the control message through MSC 604. The control message instructs mobile station 601 to begin exchanging user communications with base station 603. The control message further instructs mobile station 601 to stop exchanging user communications with base station 602. Mobile station 601 receives the control signal. Mobile station 601 begins exchanging user communications with base station 603 and stops exchanging user communications with base station 602. Mobile station 601 exchanges user communications only with base station 603. Mobile station 601 may continue to exchange status communication with base station 602.

Figure 7:
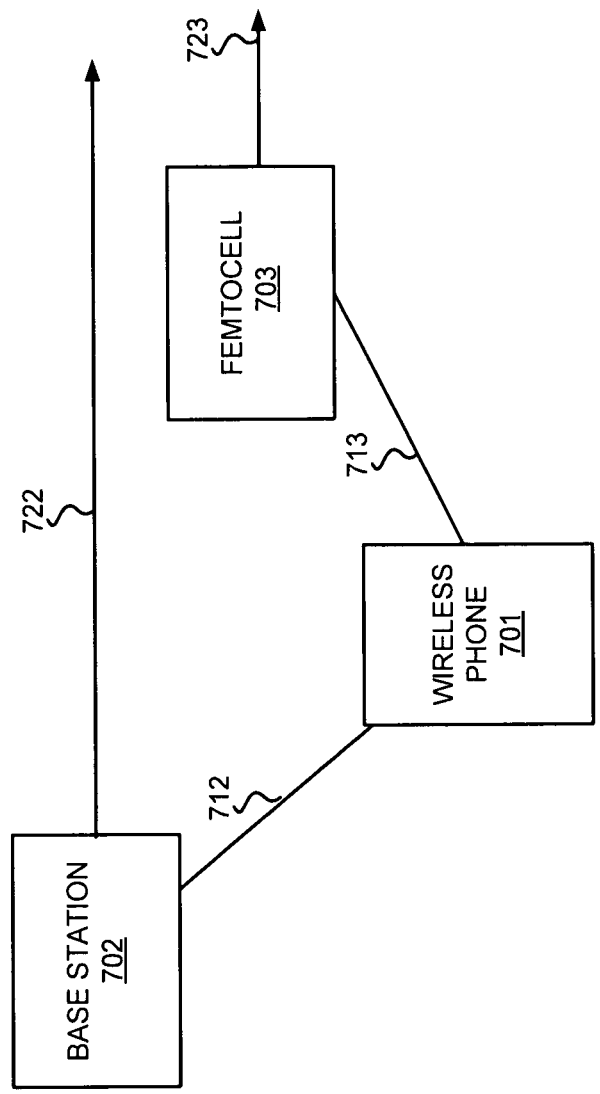
FIG. 7 is a sketch illustrating an example of the invention.

FIG. 7 is an illustration that describes an example whereby a residential customer utilizes a femtocell within a residential area. Included in FIG. 7 are wireless phone 701, base station 702, and femtocell 703. Mobile station 701 communicates with femtocell 703 over wireless link 713. Mobile station 701 communicates with base station 702 over wireless link 712. Femtocell 703 communicates with a virtual MSC (not pictured) over broadband Internet link 723. Base station 702 communicates with an MSC (not pictured) over backhaul link 722.

In this example, the residential customer is the user of wireless phone 701. Base station 702 provides wireless services for the surrounding neighborhood. However, the residential customer does not receive good coverage in his home. In order to rectify this, the customer obtains and installs femtocell 703 in his home to provide a better wireless signal in the vicinity of the residence. Unfortunately, when Homeowner is on the outer limit of the coverage area provided by femtocell 103, wireless phone 701 may repeatedly handoff between femtocell 103, using link 713 to base station 702, using link 712. This can cause problematic performance issues, such as jitter, dropped calls, or missed calls.

To prevent the adverse effects of hopping between femtocell 703 and base station 702, the residential customer pushes a button on femtocell 703. In response to the pushed button, femtocell 703 sends a notification message over broadband Internet link 723 to the virtual MSC. The notification message indicates to the virtual MSC that wireless phone 701 is located near femtocell 703 and requests to limit user communications to being exchanged solely through femtocell 703 and over wireless link 713 with the virtual MSC. The virtual MSC then sends a control message to the MSC and mobile station 101. The control message indicates that mobile station 101 should only exchange user communications with femtocell 703.

In response to the control message, mobile station 701 exchanges user communications solely with femtocell 703 over wireless link 713. Wireless phone 701 will not exchange user communications with base station 702 or any other base station until the customer presses a button on femtocell 703 that cancels the requirement. It should be understood that the same or another button could be utilized. Additionally, the requirement may be canceled if wireless phone 701 has been out of the coverage area of femtocell 703 for a certain amount of time. This prevents mobile station from becoming unusable if the customer leaves his home without pressing the cancel button on femtocell 703.

It should be understood that wireless phone 701 could be homed to femtocell 703 in a variety of ways. For example, wireless phone 701 could itself have a button, screen prompt, toggle, or other such user interface element, that when selected, directs wireless phone 701 to communicate with the virtual MSC to home wireless phone 701 to femtocell 703.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to control with which base station a mobile station exchanges user communications, the method comprising:
   receiving a user selection from a user indicating that the mobile station is near a first base station of a plurality of base stations with which the mobile station communicates;
   in response to the user selection, transferring a notification message indicating that the mobile station is nearby the first base station;
   in response to the notification message, transferring a control message for delivery to the mobile station to limit the mobile station to exchanging user communications only with the first base station; and
   exchanging user communications between the mobile station and the first base station.

2. The method of claim 1 wherein the first base station includes a user interface and wherein receiving the user selection comprises receiving the user selection from the user via the user interface.

3. The method of claim 2 wherein transferring the notification message comprises transferring the notification message from the first base station for delivery to a communication control system.

4. The method of claim 3 wherein transferring the control message comprises transferring the control message from the communication control system to the first base station and transferring the control message from the first base station to the mobile station.

5. The method of claim 1 further comprising, in response to the user selection, identifying the mobile station from among a plurality of mobile stations in communication with the first base station.

6. The method of claim 5 further comprising, in response to identifying the mobile station, transferring a confirmation request to the mobile station to confirm that the mobile station is nearby the first base station.

7. The method of claim 6 further comprising receiving a confirmation from the user that the mobile station is nearby the first base station.

8. The method of claim 1 wherein the method further comprises exchanging the user communications in a packet format between the first base station and a communication network, and wherein exchanging the user communications between the mobile station and the first base station comprises exchanging the communications in a non-packet format.

9. The method of claim 8 wherein the packet format comprises a voice over Internet protocol format.

10. The method of claim 9 wherein the non-packet format comprises a code division multiple access format.

11. A communication system for controlling with which base station a mobile station exchanges user communications, the communication system comprising:
   a first base station of a plurality of base stations with which the mobile station communicates configured to receive a user selection from a user indicating that the mobile station is near the first base station, in response to the user selection, transfer a notification message indicating that the mobile station is nearby the first base station;
   a communication control system configured to receive the notification message from the first base station, and in response, transfer a control message for delivery to the mobile station to limit the mobile station to exchanging user communications only with the first base station; and
   the first base station further configured to exchange user communications with the mobile station.

12. The communication system of claim 11 wherein the first base station includes a user interface and wherein the user interface receives the user selection from the user.

13. The communication system of claim 12 wherein the communication control system is configured to transfer the control message to the first base station and the first base station is configured to transfer the control message to the mobile station.

14. The communication system of claim 11 wherein the communication control system is further configured to, in response to the receipt of the user selection, identify the mobile station from among a plurality of mobile stations in communication with the first base station.

15. The communication system of claim 14 wherein the communication control system is further configured to, in response to the identification of the mobile station, transfer a confirmation request to the mobile station to confirm that the mobile station is nearby the first base station.

16. The communication system of claim 15 wherein the communication control system is further configured to receive a user confirmation confirming that the mobile station is nearby the first base station.

17. The communication system of claim 11 wherein the first base station is further configured to exchange user communications in a packet format between the first base station and a communication network, and exchange the user communications with the mobile station in a non-packet format.

18. The communication system of claim 17 wherein the packet format comprises a voice over Internet protocol format.

19. The communication system of claim 18 wherein the non-packet format comprises a code division multiple access format.

* * * * *